United States Patent [19]
Rajendran

[11] Patent Number: 5,981,097
[45] Date of Patent: Nov. 9, 1999

[54] MULTIPLE LAYER MEMBRANES FOR FUEL CELLS EMPLOYING DIRECT FEED FUELS

[75] Inventor: Govindarajulu Rajendran, Hockessin, Del.

[73] Assignee: E.I. du Pont de Nemours and Company, Wilmington, Del.

[21] Appl. No.: 08/987,631

[22] Filed: Dec. 9, 1997

Related U.S. Application Data

[60] Provisional application No. 60/033,433, Dec. 23, 1996.

[51] Int. Cl.⁶ ..................................... H01M 8/10
[52] U.S. Cl. ......................... 429/33; 429/309; 429/314; 429/317; 204/296
[58] Field of Search ............... 429/30, 33, 309, 429/314, 317; 204/296

[56] References Cited

U.S. PATENT DOCUMENTS

| | | | |
|---|---|---|---|
| 3,282,875 | 11/1966 | Connolly et al. | 260/29.6 |
| 3,664,915 | 5/1972 | Gore | 161/164 |
| 3,953,566 | 4/1976 | Gore | 264/288 |
| 3,962,153 | 6/1976 | Gore | 260/2.5 R |
| 4,187,390 | 2/1980 | Gore | 174/102 R |
| 4,224,121 | 9/1980 | Dempsey et al. | 204/98 |
| 4,358,545 | 11/1982 | Ezzell et al. | 521/27 |
| 4,390,603 | 6/1983 | Kawana et al. | 429/30 |
| 4,940,525 | 7/1990 | Ezzell et al. | 204/252 |
| 4,983,264 | 1/1991 | Miyake et al. | 204/98 |
| 5,272,017 | 12/1993 | Swathirajan et al. | 429/33 |
| 5,397,445 | 3/1995 | Umemura et al. | 204/296 X |
| 5,399,184 | 3/1995 | Harada | 29/623.4 |
| 5,403,675 | 4/1995 | Ogata et al. | 429/33 |
| 5,422,411 | 6/1995 | Wei et al. | 526/243 |
| 5,595,676 | 1/1997 | Barnes et al. | 429/30 X |
| 5,629,103 | 5/1997 | Wersing et al. | 429/33 |
| 5,654,109 | 8/1997 | Plowman et al. | 429/13 |
| 5,672,438 | 9/1997 | Banerjee et al. | 429/33 |
| 5,795,496 | 8/1998 | Yen et al. | 429/33 X |

FOREIGN PATENT DOCUMENTS

| | | | |
|---|---|---|---|
| 0 498 076 A1 | 8/1992 | European Pat. Off. | H01M 2/16 |
| 2 478 130 | 3/1981 | France | C23C 3/02 |
| 57-143332 | 4/1982 | Japan | C08J 5/22 |
| 57-092029 | 8/1982 | Japan | C08J 5/22 |
| 63-076265 | 9/1986 | Japan | H01M 8/02 |
| 63-076269 | 9/1986 | Japan | H01M 8/24 |
| WO 83/01597 | 5/1983 | WIPO | B32B 7/00 |
| WO94/03503 | 2/1994 | WIPO . | |
| WO96/12317 | 4/1996 | WIPO | H01M 8/22 |
| WO 96/29752 | 9/1996 | WIPO | H01M 8/10 |

*Primary Examiner*—Stephen Kalafut

[57] ABSTRACT

A cation exchange membrane having a laminated structure of at least three layers of cation exchange polymer. In a membrane in accordance with the invention, the cation exchange polymer in the laminate has a polymer backbone and cation exchange groups carried on recurring side chains attached to the polymer backbone with the number of carbon atoms in the polymer backbone in relation to the cation exchange groups defining an ion exchange ratio (IXR) for each layer. The layers have differing IXR values which provide one or more high IXR layers and one or more low IXR layers with the IXR of the low IXR layers being less than about 17 and the IXR of the high IXR layers being at least about 15. In a membrane in accordance with the invention, the high and low layers further provide a change in IXR of at least about 2 in at least two locations across the thickness of the membrane.

21 Claims, 2 Drawing Sheets

MULTIPLE LAYER MEMBRANES FOR FUEL CELLS EMPLOYING DIRECT FEED FUELS

RELATED APPLICATIONS

This application claims the benefit of Provisional application No. 60/033,433, filed Dec. 23, 1996.

GOVERNMENT RIGHTS

The Government has rights in this invention pursuant to Advanced Research Project Agency (ARPA) Contract No. N00014-95-C-0280.

FIELD OF THE INVENTION

This invention relates to cation exchange membranes useful in electrochemical cells, particularly fuel cells employing direct feed fuels such as methanol.

BACKGROUND OF THE INVENTION

A fuel cell utilizing a proton (cation) exchange membrane (PEM) as the electrolyte and employing a direct feed fuel such as methanol, ethanol, dimethoxymethane, trimethoxymethane, etc., and oxygen/air as the oxidant has the capability to replace batteries in small, portable applications. Direct methanol proton exchange membrane fuel cells (DMPEMFC's) are of particular interest for such applications. At the present time, the performance level of DMPEMFC's is almost high enough that small cells of this type can be competitive with primary lithium batteries in terms of size and weight. Such fuel cells have several advantages over lithium batteries including (a) the potential for much lighter weight and greater compactness, especially for long-duration operating times, (b) simpler "recharge" involving only the addition of fuel rather than battery replacement and (c) elimination of disposal issues (quite expensive for lithium batteries) and the need for storage of batteries.

The DMPEMFC is also a potentially attractive power source for vehicles and other low to medium power applications such as auxiliary power supplies and lawn mowers. Benefits to be derived from using DMPEMFC's as power sources include dramatic reductions in emissions of air pollutants, reduction in the nation's dependence on imported petroleum since methanol can be made from indigenous fuels such as coal and natural gas and also from renewable sources such as wood and biomass, and an overall increase in energy efficiency. Since liquid methanol as a fuel has a much higher energy density, it avoids the difficulties and hazards associated with the handling of gaseous reactants such as hydrogen. Consequently, DMPEMEC's have the potential for use in vehicles, particularly in California and the Northeast where there are initiatives for low or zero-emission vehicles.

One drawback to fuel cells which employ direct feed fuels, particularly DMPEMFC's, is that that proton (cation) exchange membranes do not totally prevent the so-called "crossover" of fuel through the membrane. The term "crossover" refers to the undesirable transport of fuel through the membrane from the fuel electrode or anode side to the oxygen electrode or cathode side of the fuel cell.

The fuel crossover diminishes cell performance for two primary reasons. Firstly, the transported fuel cannot react electrochemically on the anode side and, therefore, contributes directly to a loss of fuel efficiency (effectively a fuel leak). Secondly, the transported fuel interacts with the cathode i.e., the oxygen electrode, and lowers its operating potential and hence the overall cell voltage. The reduction of cell voltage lowers specific cell power output and also reduces the overall efficiency. Therefore, it is especially desirable to provide a cation exchange membrane for use in a fuel cell which has a low fuel crossover rate.

SUMMARY OF THE INVENTION

The invention provides a cation exchange membrane having a laminated structure of at least three layers of cation exchange polymer. In a membrane in accordance with the invention, the cation exchange polymer in the laminate has a polymer backbone and cation exchange groups carried on recurring side chains attached to the polymer backbone with the number of carbon atoms in the polymer backbone in relation to the cation exchange groups defining an ion exchange ratio (IXR) for each layer. The layers have differing IXR values which provide one or more high IXR layers and one or more low IXR layers with the IXR of the low IXR layers being less than about 17 and the IXR of the high IXR layers being at least about 15. In a membrane in accordance with the invention, the high and low layers further provide a change in IXR of at least about 2 in at least two locations across the thickness of the membrane.

In a preferred form of the invention, the high IXR layers have an IXR of at least about 17, most preferably about 19 to about 29. The low IXR layers preferably have an IXR of less than about 16, most preferably about 12 to about 15. It is also preferred for the layers to provide a change in IXR of at least about 4, most preferably at least about 6, in at least one location across the thickness of the membrane. Preferably, the layers have a thickness of about 2 $\mu$m to about 125 $\mu$m, most preferably about 5 $\mu$m to about 50 $\mu$m.

In a preferred form of the invention, the polymer is highly fluorinated and preferably the ion exchange groups of the polymer are sulfonate groups.

Preferably, a low IXR layer forms at least one of the outside surfaces of the membrane and, when employed in a fuel cell, this surface preferably faces the cathode.

In a preferred form of the invention, the laminated structure comprises at least about four layers providing a change in IXR of at least about 2 in at least three locations across the thickness of the membrane. More preferably, the laminated structure comprises at least about five layers providing a change in IXR of at least about 2 in at least four locations across the thickness of the membrane. Even more preferably, the laminated structure comprises at least about six layers providing a change in IXR of at least about 2 in at least five locations across the thickness of the membrane. Most preferably, the laminated structure comprises at least about seven layers providing a change in IXR of at least about 2 in at least six locations across the thickness of the membrane.

If desired, the membrane is advantageously provided as catalyst coated membrane with an electrode containing electrically-conductive catalyst particles formed on its surface.

The membrane of the invention is advantageously employed in a fuel cell comprising an anode compartment and a cathode compartment with the membrane serving as a separator and electrolyte between the anode and cathode compartments. Preferably, the fuel cell is operable as a fuel cell employing a direct feed fuel and, most preferably, as a direct methanol fuel cell. In a fuel cell in accordance with the invention, methanol crossover is substantially reduced, up to about 50% when preferred membranes are employed.

DETAILED DESCRIPTION

Figure 1:
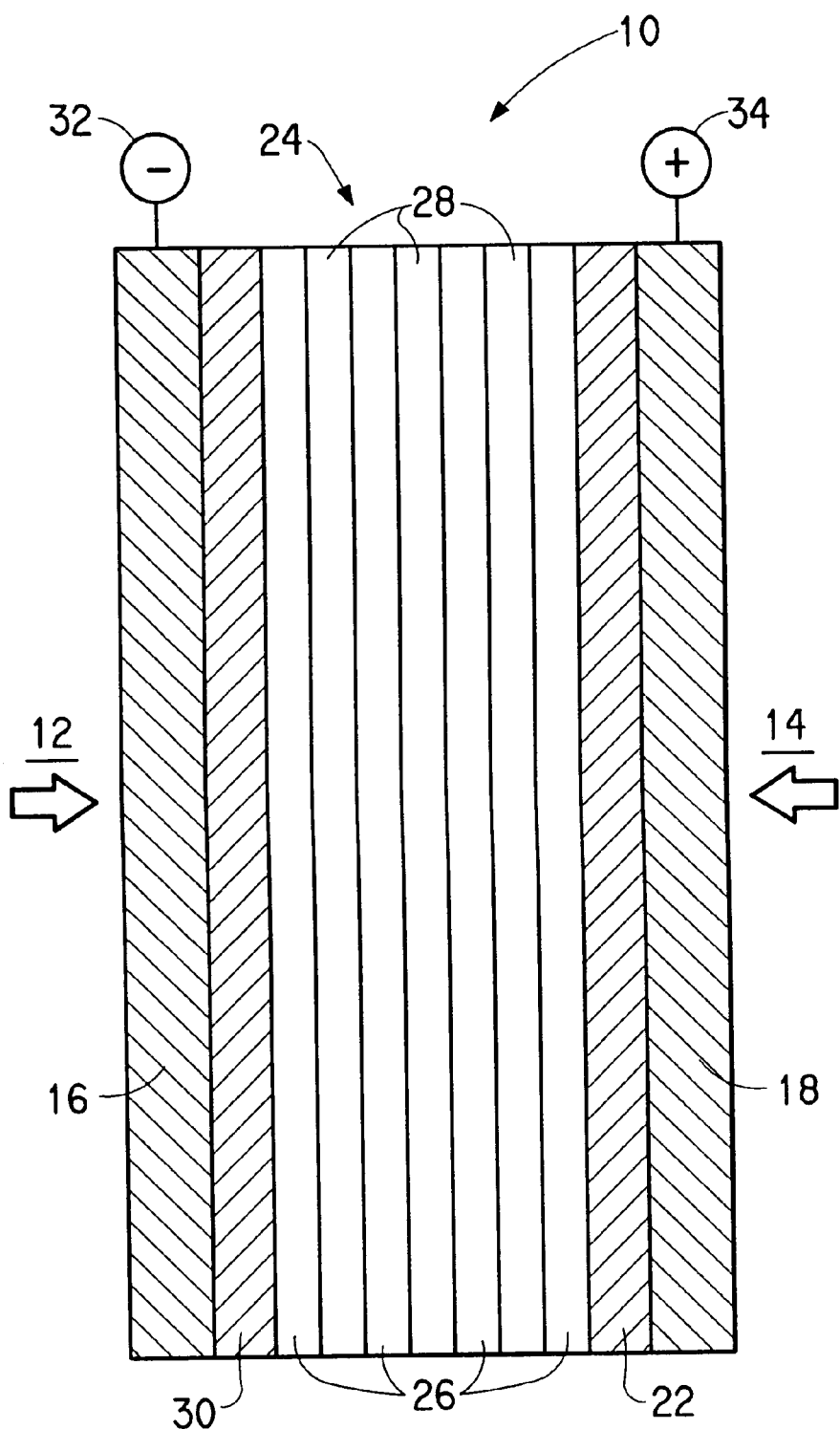
FIG. 1 is a schematic drawing which depicts the structure of a preferred membrane and electrode structure (MEA) employing a membrane in accordance with the present invention.

It has been discovered that the efficiency of fuel cell employing a direct feed fuel such as a direct methanol fuel cell is significantly improved by using a cation exchange membrane comprising a laminate of at least three layers of cation exchange polymer as will be described hereinafter. The polymer in the laminate has a polymer backbone and cation exchange groups carried on recurring side chains attached to the polymer backbone.

The cation exchange groups of the polymer are preferably selected from the group consisting of sulfonate, carboxylate, phosphonate, imide, sulfonimide and sulfonamide groups. Most preferably, the cation exchange groups are sulfonate groups. Various known cation exchange polymers can be used including polymers and copolymers of trifluoroethylene, tetrafluoroethylene (TFE), styrene-divinyl benzene, $\alpha,\beta,\beta$-trifluorostyrene, etc., in which cation exchange groups have been introduced. $\alpha,\beta,\beta$-trifluorostyrene polymers useful for the practice of the invention are disclosed in U.S. Pat. No. 5,422,411.

Preferably, the polymer in accordance with the invention is highly fluorinated and the ion exchange groups are sulfonate groups. The term "sulfonate groups" is intended to refer either to sulfonic acid groups or alkali metal or ammonium salts of sulfonic acid groups. "Highly fluorinated" means that at least 90% of the total number of halogen and hydrogen atoms are fluorine atoms. Most preferably, the polymer is perfluorinated.

Possible highly fluorinated polymers include homopolymers or copolymers of two or more monomers. Copolymers are typically formed from one monomer which is a non-functional monomer and which provides carbon atoms for the polymer backbone. A second monomer provides both carbon atoms for the polymer backbone and also contributes the side chain carrying the cation exchange group or its precursor, e.g., a sulfonyl fluoride group ($—SO_2F$), which can be subsequently hydrolyzed to a sulfonate functional group. For example, copolymers of a first fluorinated vinyl monomer together with a second fluorinated vinyl monomer having a sulfonyl fluoride group ($—SO_2F$) can be used. Possible first monomers include tetrafluoroethylene (TFE), hexafluoropropylene, vinyl fluoride, vinylidine fluoride, trifluoroethylene, chlorotrifluoroethylene, perfluoro (alkyl vinyl ether), and mixtures thereof. Possible second monomers include a variety of fluorinated vinyl ethers with sulfonate functional groups or precursor groups which can provide the desired side chain in the polymer. The first monomer may also have a side chain which does not interfere with the ion exchange function of the sulfonate functional group. Additional monomers can also be incorporated into these polymers if desired.

A class of preferred polymers for use in the present invention include a highly fluorinated, most preferably perfluorinated, carbon backbone and the side chain is represented by the formula $—(O—CF_2CFR_f)_a-O—CF_2CFR'_fSO_3X$, wherein $R_f$ and $R'_f$ are independently selected from F, Cl or a perfluorinated alkyl group having 1 to 10 carbon atoms, a=0, 1 or 2, and X is H, Li, Na, K or $N(R^1)(R^2)(R^3)(R^4)$ and $R^1$, $R^2$, $R^3$, and $R^4$ are the same or different and are H, $CH_3$ or $C_2H_5$. The preferred polymers include, for example, polymers disclosed in U.S. Pat. No. 3,282,875 and in U.S. Pat. Nos. 4,358,545 and 4,940,525. One preferred polymer comprises a perfluorocarbon backbone and the side chain is represented by the formula $—O—CF_2CF(CF_3)—O—CF_2CF_2SO_3X$, wherein X is as defined above. Polymers of this type are disclosed in U.S. Pat. No. 3,282,875 and can be made by copolymerization of tetrafluoroethylene (TFE) and the perfluorinated vinyl ether $CF_2=CF—O—CF_2CF(CF_3)—O—CF_2CF_2SO_2F$, perfluoro (3,6-dioxa-4-methyl-7-octenesulfonyl fluoride) (PDMOF), followed by conversion to sulfonate groups by hydrolysis of the sulfonyl fluoride groups and ion exchanging if needed to convert to the desired form. One preferred polymer of the type disclosed in U.S. Pat. Nos. 4,358,545 and 4,940,525 has the side chain $—O—CF_2CF_2SO_3X$, wherein X is as defined above. This polymer can be made by copolymerization of tetrafluoroethylene (TFE) and the perfluorinated vinyl ether $CF_2=CF—O—CF_2CF_2SO_2F$, perfluoro(3-oxa-4-pentenesulfonyl fluoride) (POPF), followed by hydrolysis and acid exchange if needed.

If desired, cation exchange polymer having dispersed inorganic filler as disclosed in PCT Publication No. WO9629752, published Sep. 26, 1996 may be incorporated into some or all of the layers of the membrane. If dispersed inorganic filler is used in some of the layers and, especially if only used in one layer, it is preferable for the surface layer facing the anode (fuel electrode) to contain the inorganic filler.

In this application, "ion exchange ratio" or "IXR" is defined as number of carbon atoms in the polymer backbone in relation to the cation exchange groups. In accordance with the invention, the IXR of the cation exchange polymer in the layers varies as will be discussed in more detail hereinafter. Typically, however, the IXR range used for layers of the laminated membrane is usually about 7 to about 33. For perfluorinated polymers of the type described above, the cation exchange capacity of a polymer is often expressed in terms of equivalent weight (EW). For the purposes of this application, equivalent weight (EW) is defined to be the weight of the polymer in sulfonic acid form required to neutralize one equivalent of NaOH. In the case where the polymer comprises a perfluorocarbon backbone and the side chain is the salt of $—O—CF_2—CF(CF_3)—O—CF_2—CF_2—SO_3H$, the equivalent weight range which corresponds to an IXR of about 7 to about 33 is about 700 EW to about 2000 EW. IXR for this polymer can be converted to equivalent weight using the following formula: 50IXR +344=EW. While generally the same IXR range is used for polymers disclosed in U.S. Pat. Nos. 4,358,545 and 4,940,525, the equivalent weight is somewhat lower because of the lower molecular weight of the monomer unit containing a cation exchange group. For the IXR range of about 7 to about 33, the corresponding equivalent weight range is about 500 EW to about 1800 EW. IXR for this polymer can be converted to equivalent weight using the following formula: 50 IXR+178=EW.

In a membrane in accordance with the invention, the layers have differing IXR values which define one or more high IXR layers and one or more low IXR layers. The IXR of the low IXR layers is less than about 17 and the IXR of the high IXR layers is at least about 15. Preferably, the high IXR layers have an IXR of at least about 17, most preferably about 19 to about 29. The low IXR layers preferably have an IXR of less than about 16, most preferably about 12 to about 15.

In a membrane in accordance with the invention, the high and low layers further provide a change in IXR of at least about 2 in at least two locations across the thickness of the membrane. While the change in IXR may occur across several layers in the laminated structure, it is preferable for the change to occur between adjacent layers. It is also preferred for the layers to provide a change in IXR of at least about 4, most preferably at least about 6, in at least one location across the thickness of the membrane.

It is preferable for a low IXR layer to form at least one of the outside surfaces of the membrane. In an embodiment of the invention having only three layers, both outside surfaces will consequently be low IXR layers. In a fuel cell employing a membrane with only one of the surfaces being a low IXR layer, it should face towards the cathode compartment of the fuel cell.

In a preferred form of the invention, the laminated structure comprises at least about four layers providing a change in IXR of at least about 2 in at least three locations across the thickness of the membrane. More preferably, the laminated structure comprises at least about five layers providing a change in IXR of at least about 2 in at least four locations across the thickness of the membrane. Even more preferably, the laminated structure comprises at least about six layers providing a change in IXR of at least about 2 in at least five locations across the thickness of the membrane. Most preferably, the laminated structure comprises at least about seven layers providing a change in IXR of at least about 2 in at least six locations across the thickness of the membrane. While larger numbers of thin layers are advantageously employed, the total thickness of the membrane will increase with increasing layers unless the layers are made even more thin. Typically, conductivity and therefore cell performance decrease with increasing thickness. It is believed that there is no advantage to using more than about 100 layers.

The thickness of the membrane can be varied as desired for a particular electrochemical cell application. Preferably, the layers have a thickness of about 2 $\mu$m to about 125 $\mu$m, most preferably about 5 $\mu$m to about 50 $\mu$m. Typically, the total thickness of the membrane is generally less than about 250 $\mu$m, preferably in the range of about 10 $\mu$m to about 200 $\mu$m.

In a membrane in accordance with the invention, it is believed that the laminated structure enables the high IXR layers to function for the purposes of conductivity as if they had a lower IXR. Nevertheless, for the purposes of fuel crossover in a fuel cell employing a direct fuel, it is believed that the high IXR layers function to reduce fuel crossover since the fuel crossover of the membrane is reduced. Consequently, membranes in accordance with the invention can have essentially equivalent electrical performance to one ply membranes with the same thickness while at the same time providing substantially reduced fuel crossover rates. Preferably, for good cell performance the laminated structure and total thickness should be selected such that the conductivity of the membrane is about 0.01 S/cm to about 0.2 S/cm. The membranes are thus advantageously employed in fuel cells such as those employing direct feed fuels such as methanol.

In the manufacture of membranes using polymer which is highly fluorinated polymer and which has sulfonate ion exchange groups, films can be advantageously formed from the polymer in its sulfonyl fluoride form since it is thermoplastic in this form and conventional extrusion techniques for making films from thermoplastic polymer can be used. One desirable method for making the laminated structure of the membranes in accordance with the invention is laminating three or more extruded films of the polymer in thermoplastic ($-SO_2F$) form or co-extruding such polymer to form the three or more polymer layers. For lamination of films of TFE/PDMOF polymer in sulfonyl fluoride form, temperatures of about 220° C. to about 250° C. at pressures of 30,000 to about 45,000 kPa can be used. The polymer may also be extruded and laminated or co-extruded in another thermoplastic form such as by having $-SO_3X$ groups where X is a quaternary amine group. Alternatively, solution film casting techniques using suitable solvents for the particular polymer can also be used to make films for subsequent lamination if desired. The laminated structure can also be formed directly using coating processes which deposit the polymer in the desired layers.

A film of the polymer in sulfonyl fluoride form or a laminate of such films can be converted to the sulfonate form (sometimes referred to as ionic form) by hydrolysis using methods known in the art. For example, the membrane may be hydrolyzed to convert it to the sodium sulfonate form by immersing it in 25% by weight NaOH for about 16 hours at a temperature of about 90° C. followed by rinsing the film twice in deionized 90° C. water using about 30 to about 60 minutes per rinse. Another possible method employs an aqueous solution of 6–20% of an alkali metal hydroxide and 5–40% polar organic solvent such as dimethyl sulfoxide with a contact time of at least 5 minutes at 50–100° C. followed by rinsing for 10 minutes. After hydrolyzing, the membrane can be converted if desired to another ionic form by contacting the membrane in a bath containing a 1% salt solution containing the desired cation or, to the acid form, by contacting with an acid and rinsing. For fuel cell use, the membrane is usually in the sulfonic acid form.

It is also possible to laminate films of the polymer in its ionic, sulfonate form. For TFE/PDMOF polymer films which have been hydrolyzed and fully acid exchanged, the lamination of films is suitably performed by heating the polymer to about 130° C. to about 160° C. at pressures of about 15,000 to about 30,000 kPa. It is also possible to make the laminated structures using coating processes employing the hydrolyzed and acid exchanged polymer in the form of a dispersion.

The membrane may optionally include a porous support in one or more of its layers for the purposes of improving mechanical properties, decreasing cost and/or other reasons. The porous support of the membrane may be made from a wide range of components. The porous support of the present invention may be made from a hydrocarbon such as a polyolefin, e.g., polyethylene, polypropylene, polybutylene, copolymers of those materials, and the like. Perhalogenated polymers such as polychlorotrifluoroethylene may also be used. For resistance to thermal and chemical degradation, the support preferably is made of a highly fluorinated polymer, most preferably perfluorinated polymer.

For example, the polymer for the porous support can be a microporous film of polytetrafluoroethylene (PTFE) or a copolymer of tetrafluoroethylene with

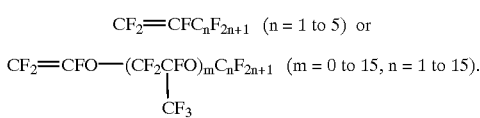

Microporous PTFE films and sheeting are known which are suitable for use as a support layer. For example, U.S. Pat. No. 3,664,915 discloses uniaxially stretched film having at least 40% voids. U.S. Pat. Nos. 3,953,566, 3,962,153 and 4,187,390 disclose porous PTFE films having at least 70% voids.

Alternatively, the porous support may be a fabric made from fibers of the polymers discussed above woven using various weaves such as the plain weave, basket weave, leno weave, or others.

A membrane or a membrane layer can be made using the porous support by coating cation exchange polymer on the support so that the coating is on the outside surfaces as well as being distributed through the internal pores of the support. This may be accomplished by impregnating the porous support with a solution/dispersion of the cation exchange polymer or cation exchange polymer precursor using a solvent which is not harmful to the polymer of the support under the impregnation conditions and which can form a thin, even coating of the cation exchange polymer on the support. For example, for applying a coating of perfluorinated sulfonic acid polymer to a microporous PTFE support, a 1–10 weight percent dispersion of the polymer in water mixed with sufficient amount of a polar organic solvent can be used. The support with the dispersion is dried to form the membrane. If desired, some or all of the other layers of the membrane can be laminated to one or both sides of the impregnated porous support. Alternatively, the additional layers may be applied using coating techniques.

With reference to FIG. 1, a membrane and electrode assembly (MEA) 10 is illustrated as used in a fuel cell in accordance with the invention. In a preferred embodiment of the invention, the fuel cell utilizes a methanol fuel source indicated by arrow 12 (typically a methanol/water solution) supplied to an anode compartment (not shown) and an oxidizer source indicated by arrow 14 such as air or oxygen supplied to a cathode compartment (not shown).

MEA 10 includes a cation exchange membrane 24 in accordance with the invention which serves as an electrolyte (for proton transport) and which separates the anode compartment from the cathode compartment. A porous anode current collector 16 and a porous cathode current collector 18 are provided to conduct current from the cell. Cathode current collector 18 is electrically connected to positive terminal 34 and anode current collector 16 is electrically connected to negative terminal 32. MEA 10 also includes a catalyst layer 22 which functions as the cathode and is in contact with and between the cathode-facing surface of membrane 24 and the cathode current collector 18. A catalyst layer 30 which functions as the anode is disposed between and is in contact with the anode-facing surface of the membrane 26 and anode current collector 16.

The membrane 24 depicted is a preferred composite membrane having seven alternating low and high IXR layers, 26 and 26 respectively. The membrane 24 depicted has four low IXR layer 28 and three high IXR layers 28. Two of the low IXR layers 26 of the membrane 24 are on the outside of the membrane and are in contact with the catalyst layers 22 and 30 and thus face the cathode and anode compartments. In addition, in the preferred membrane depicted, all of the high IXR layers are sandwiched between two low IXR layers.

The anode current collector 16 and the cathode current collector 18 may be constructed as is known in the art. These structures may be the same or different. Access of oxygen, typically air to the catalyst layer is provided by employing a porous cathode current collector 18. Similarly, the anode current collector 16 is porous to permit the access of the methanol/water solution. While conductive metal screens, porous plates or other materials may also be used, a preferred material for the current collectors is conductive paper or cloth made of carbon fibers with suitable conductivity and porosity. Typically, the current collectors are bonded in the MEA by the application of heat and pressure or alternatively may held in contact with the electrodes by compressive forces in the cell.

The catalyst layers 22 and 30 may be made from well-known electrically conductive, catalytically active particles or materials and may be made by methods well known in the art. When the current collectors are carbon paper, the catalyst layers 22 and 30 may be formed on the carbon papers. Preferably, however, the catalyst layers 22 and 30 are formed on the membrane to provide more intimate contact between the electrode and the membrane. This can be accomplished by forming the electrode on the membrane using a coating process. Membrane with at least one electrode containing electrically-conductive catalyst particles formed by such a method are referred to in this application as "catalyst coated membranes".

Electrodes on catalyst coated membranes typically employ a polymer which serves as a binder for the catalyst particles. The binder polymer can be a hydrophobic polymer, a hydrophilic polymer or a mixture of such polymers. For example, using a perfluorinated sulfonic acid polymer membrane with a platinum group metal or metal oxide catalyst, the binder polymer can also be perfluorinated sulfonic acid polymer. It is typical for the platinum group metal or metal oxide catalyst to be supported on carbon particles. For direct methanol fuel cells, a preferred catalyst for the anode 30 is $(Pt-Ru)O_x$ on carbon particles and a preferred catalyst for the cathode 22 is Pt on carbon particles. In the catalyst layers 22 and 30, the particles are preferably uniformly dispersed in the polymer to assure that a uniform and controlled depth of the catalyst is maintained, preferably at a high volume density with the particles being in contact with adjacent particles to form a low resistance conductive path through catalyst layer.

The catalyst layers 22 and 30 formed on the membrane should be porous so that they are readily permeable to the gases/liquids which are consumed and produced in cell. The average pore diameter is preferably in the range of 0.01 to 50 $\mu$m, most preferably 0.1 to 30 $\mu$m. The porosity is generally in a range of 10 to 99%, preferably 10 to 60%.

The catalyst layers are preferably formed using an "ink", i.e., a solution or dispersion of the binder polymer and the catalyst particles, which is used to apply a coating to the membrane. The area of the membrane to be coated with the ink may be the entire area or only a selected portion of the surface of the membrane. The catalyst ink may be deposited upon the surface of the membrane by any suitable technique including spreading it with a knife or blade, brushing, pouring, metering bars, spraying and the like. If desired, the coatings are built up to the thickness desired by repetitive application. Areas upon the surface of the membrane which require no catalyst materials, can be masked, or other means can be taken to prevent the deposition of the catalyst material upon such areas. The desired loading of catalyst upon the membrane can be predetermined, and the specific amount of catalyst material can be deposited upon the surface of the membrane so that no excess catalyst is applied. The catalyst particles are preferably deposited upon the surface of a membrane in a range from about 0.2 mg/cm$^2$ to about 20 mg/cm$^2$.

An alternative to depositing the catalyst layer directly onto the membrane is so-called "decal" process. In this process, the catalyst ink is coated, painted, sprayed or screen printed onto a substrate and the solvent is removed. The resulting "decal" is then subsequently transferred from the substrate to the membrane surface and bonded, typically by the application of heat and pressure.

EXAMPLE 1
Part 1—Membrane Fabrication

Membranes used in the following examples are described in Table 1. All membranes are made from copolymer of TFE and $CF_2=CF-O-CF_2CF(CF_3)-O-CF_2CF_2SO_2F$ (PDMOF).

The laminates are made by stacking films of the polymer in sulfonyl fluoride form and hand rolling so that no air bubbles or moisture are trapped between the layers. The layers are introduced in a press preheated to 230–240° C. and pressed at 5000–6500 psi (34000–44000 kPa) for 3–5 minutes. The laminate is cooled to less than 50° C. and removed from the press. The membrane is then hydrolyzed using an aqueous solution of 16 weight % of an alkali metal hydroxide and 20 weight % dimethyl sulfoxide with a contact time of about 1–2 hours at 50–100° C. followed by rinsing for 10 minutes. Acid exchange is performed by contacting with an 10 weight % $HNO_3$ acid at 60–80° C. for a period of about 60 minutes. The hydrolyzed and acid exchanged membrane is clear and transparent. Membrane A is commercially available membrane sold under the trademark Nafion® 117 by E.I. du Pont de Nemours and Company.

TABLE 1

Membrane Descriptions

| Membrane | Plies | Total Thickness | Description |
|---|---|---|---|
| A | 1 | 7 mil (175 μm) | 15 IXR |
| B | 2 | 2 mil (50 μm) | 23 IXR/23 IXR |
| C | 3 | 4 mil (100 μm) | 1 mil 15 IXR \| 1 mil 23 IXR \| 2 mil 15 IXR |
| D | 5 | 5 mil (125 μm) | 1 mil 15 IXR \| 1 mil 23 IXR \| 1 mil 15 IXR \| 1 mil 23 IXR \| 1 mil 15 IXR |
| E | 6 | 7 mil (175 μm) | 1 mil 15 IXR \| 1 mil 23 IXR \| 1 mil 15 IXR \| 1 mil 23 IXR \| 1 mil 15 IXR \| 2 mil 15 IXR |
| F | 7 | 7 mil (175 μm) | 1 mil 15 IXR \| 1 mil 23 IXR \| 1 mil 15 IXR \| 1 mil 23 IXR \| 1 mil 15 IXR \| 1 mil 23 IXR \| 1 mil 15 IXR |

Part 2—Fuel Cell Evaluation

The membranes described in Table 1 are evaluated for fuel cell performance and methanol cross-over in a cell employing a membrane and electrode assembly (HA) of the type depicted in FIG. 1. For this purpose the anode and cathode electrode structures are initially fabricated using $(Pt-Ru)O_x$ (purchased from Giner Inc., Waltham, Mass.) and Pt black (purchased from Johnson Malthey,-Alfa-Aesae) catalyst powders supported on Toray carbon paper (Toray Industries INC, Japan). The MEA is made using $(Pt-Ru)O_x$ carbon paper-supported anode structure and Pt black carbon paper-supported cathode structures which are integrally bonded by hot pressing to the membranes at 135–140° C. for 2–3 minutes @ 1000–2000 psi (6900–13800 kPa). The MEA is placed in a baseline PEM fuel cell fixture having an active cell area of approximately 25 cm$^2$. An aqueous solution of 1 M methanol is passed over the $(Pt-Ru)O_x$ electrode and ambient pressure air at 60 ° C. is passed over the Pt cathode.

Figure 2:
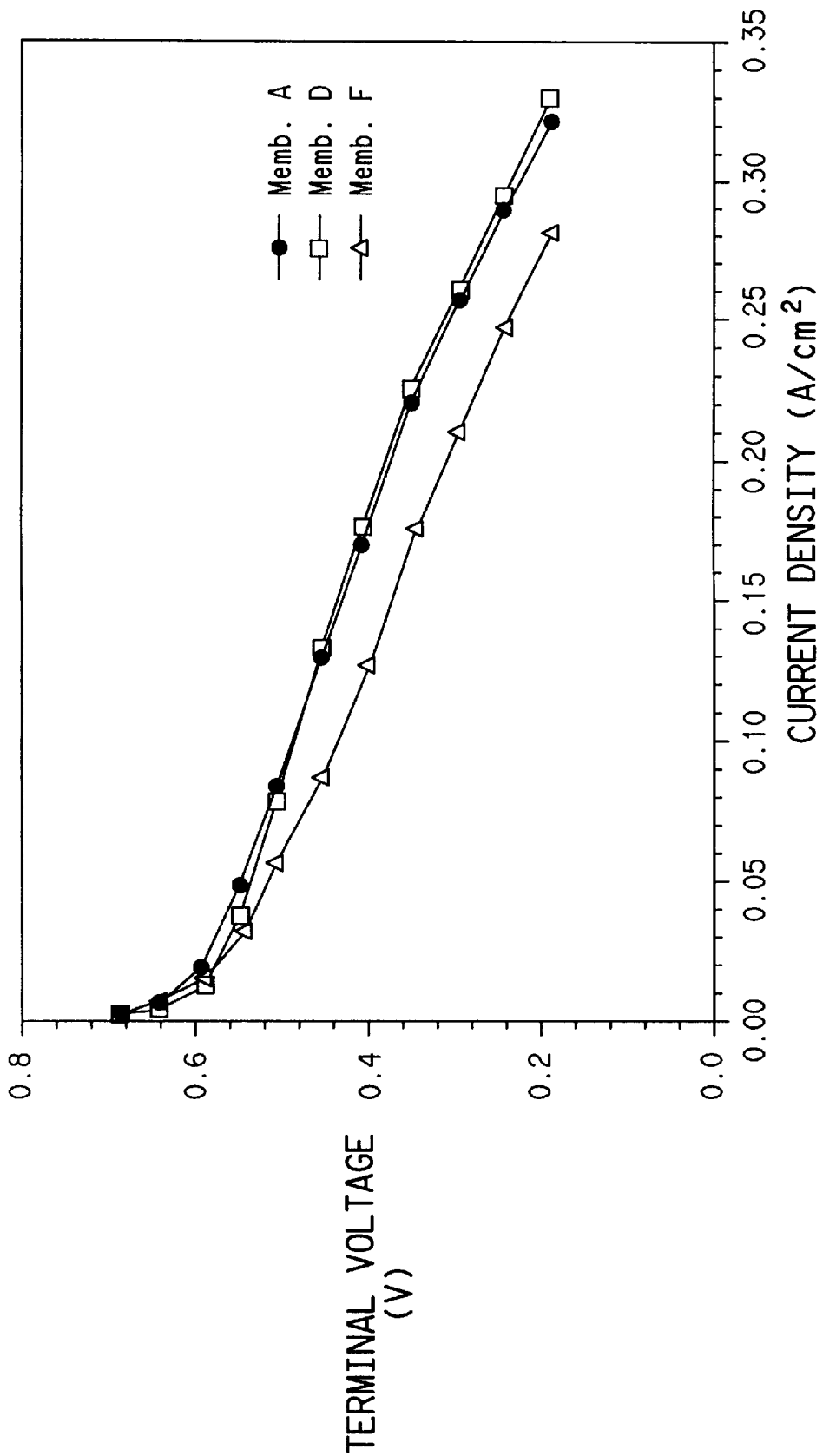
FIG. 2 is a graphical representation of voltage plotted against current density in a direct methanol fuel cell which illustrates the effect on cell performance of using membranes in accordance with the invention.

Table 2 shows the comparative fuel cell performance of bonded membrane and electrode assemblies fabricated from Membranes mentioned in Table 1. At 150 mA/cm$^2$ the average voltage performance of Membranes D and F is 0.420 and 0.390 V respectively and that of Membrane A is 0.41V. There is practically no fuel cell performance loss seen by employing Membrane D compared to the standard Membrane A (FIG. 2).

TABLE 2

Fuel Cell Performance Comparison

| Membrane | Cell Resistance (mohm) | Performance at 150 mA/cm$^2$ (V) |
|---|---|---|
| A | 9–10 | 0.410 |
| B | 15 | 0.310 |
| C | 11 | 0.390 |
| D | 11 | 0.420 |
| E | 11 | 0.390 |
| F | 15 | 0.390 |

Part 3—Methanol Crossover Evaluation

The methanol crossover or permeability is determined by analyzing the $CO_2$ formed by the parasitic reaction on the cathode of the $O_2$ feed gas and the permeating methanol. A Non-Dispersive Infrared Analyzer (Model VIA 510, Horiba Instruments Inc., USA) is used to measure the $CO_2$ quantitatively in the cathodic exit gas stream. The cell set-up, membrane electrode assemblies and experimental conditions are same as employed in the previous fuel cell performance evaluation. The volume percent of $CO_2$ measured as above is converted into equivalent crossover current densities. Crossover current densities are reported in Table 3.

The analysis indicates that the methanol crossover is approximately 34% less for Membrane D and 50% less for Membrane F compared to the standard Membrane A under similar conditions. The cross over current densities are used to calculate the % fuel efficiencies of the cell employing the various membranes and these values are reported in Table 3. The % fuel efficiencies for Membranes D and F and found to be 70 and 76%, respectively, compared to 61% for Membrane A. Therefore, use of Membranes D and F in a liquid feed direct methanol fuel cell will result in a less parasitic loss of methanol (higher Faradaic efficiency) and with negligible loss in electrical performance.

TABLE 3

Methanol Crossover Current Density and % Fuel Efficiency

| Membrane | Cross-over Current Density at 150 mA/cm$^2$ (mA/cm$^2$) | % Fuel Efficiency |
|---|---|---|
| A | 96 | 61 |
| B | 72 | 68 |
| C | 72 | 68 |
| D | 63 | 70 |
| E | 70 | 68 |
| F | 48 | 76 |

EXAMPLE 2

Membranes as in Table 1 are also fabricated using hydrolyzed and acid exchanged 1 mil (25 μm) films. In this case the hydraulic press temperature is reduced to 140–150° C. and the membranes are pressed at 3000–6000 psi (20700–41000 kPa) for 2–3 minutes to provide a composite membrane. The fuel cell performance and methanol crossover rate is observed to be approximately the same.

What is claimed is:

1. A cation exchange membrane comprising a laminated structure of at least three layers of cation exchange polymer having a polymer backbone and cation exchange groups carried on recurring side chains attached to said polymer backbone with the number of carbon atoms in said polymer backbone in relation to said cation exchange groups defining an ion exchange ratio (IXR) for each layer, said layers having differing IXR values which define one or more high IXR layers and one or more low IXR layers, the IXR of said high IXR layers being higher than the IXR of said low layers, said IXR of said low IXR layers being less than about 17 and said IXR of said high IXR layers being at least about 15, said high and low layers further providing a change in IXR of at least about 2 in at least two locations across the thickness of the membrane.

2. The membrane of claim 1 wherein said high IXR layers have an IXR of at least about 17.

3. The membrane of claim 1 wherein said high IXR layers have an IXR of about 19 to about 29.

4. The membrane of claim 1 wherein said low IXR layers have an IXR of less than about 16.

5. The membrane of claim 1 wherein said low IXR layers have an IXR of about 12 to about 15.

6. The membrane of claim 1 wherein said layers provide a change in IXR of at least about 4 in at least one location across the thickness of the membrane.

7. The membrane of claim 1 wherein said layers provide a change in IXR of at least about 6 in at least one location across the thickness of the membrane.

8. The membrane of claim 1 wherein said layers have a thickness of about 2 $\mu$m to about 125 $\mu$m.

9. The membrane of claim 1 wherein said layers have a thickness of about 5 $\mu$m to about 50 $\mu$m.

10. The membrane on claim 1 wherein said polymer is highly fluorinated.

11. The membrane of claim 10 wherein said ion exchange groups of said polymer are sulfonate groups.

12. The membrane of claim 1 wherein a low IXR layer forms at least one of the outside surfaces of the membrane.

13. The membrane of claim 1 wherein said laminated structure comprises at least about four layers providing a change in IXR of at least about 2 in at least three locations across the thickness of the membrane.

14. The membrane of claim 1 wherein said laminated structure comprises at least about five layers providing a change in IXR of at least about 2 in at least four locations across the thickness of the membrane.

15. The membrane of claim 1 wherein said laminated structure comprises at least about six layers providing a change in IXR of at least about 2 in at least five locations across the thickness of the membrane.

16. The membrane of claim 1 wherein said laminated structure comprises at least about seven layers providing a change in IXR of at least about 2 in at least six locations across the thickness of the membrane.

17. The membrane of claim 1 further comprising an electrode containing electrically-conductive catalyst particles formed on one of its surfaces.

18. A fuel cell comprising an anode compartment a cathode compartment and a cation exchange membrane serving as a separator and electrolyte between said anode and cathode compartments, said membrane having an electrode in contact with at least one of its surfaces, said membrane comprising a laminated structure of at least three layers of cation exchange polymer having a polymer backbone and cation exchange groups carried on recurring side chains attached to said polymer backbone with the number of carbon atoms in said polymer backbone in relation to said cation exchange groups defining an ion exchange ratio (IXR) for each layer, said layers having differing IXR values which define one or more high IXR layers and one or more low IXR layers, the IXR of said high IXR layers being higher than the IXR of said low layers, said IXR of said low IXR layers being less than about 17 and said IXR of said high IXR layers being at least about 15, said high and low layers further providing a change in IXR of at least about 2 in at least two locations across the thickness of the membrane.

19. The fuel cell of claim 18 wherein a low IXR layer forms at least the outside surface of said membrane facing the cathode compartment.

20. The fuel cell of claim 18 operable as a fuel cell employing a direct feed fuel.

21. The fuel cell of claim 18 operable as a direct methanol fuel cell.

* * * * *